United States Patent [19]

Zweigart

[11] Patent Number: 4,991,904
[45] Date of Patent: Feb. 12, 1991

[54] COLLAPSIBLE TOP FOR MOTOR VEHICLES
[75] Inventor: Gerhard Zweigart, Aidlingen, Fed. Rep. of Germany
[73] Assignee: Daimler-Benz AG, Fed. Rep. of Germany
[21] Appl. No.: 336,025
[22] Filed: Apr. 11, 1989
[30] Foreign Application Priority Data
Apr. 28, 1988 [DE] Fed. Rep. of Germany ....... 3814379
[51] Int. Cl.⁵ ............................................... B60J 7/12
[52] U.S. Cl. ..................................... 296/121; 296/219
[58] Field of Search .................. 296/107, 118, 120.1, 296/121, 218, 219

[56] References Cited
U.S. PATENT DOCUMENTS

| 1,354,987 | 10/1920 | Miller | 296/107 |
| 2,046,574 | 7/1936 | Olivier | 296/107 |
| 2,752,192 | 6/1956 | Doty et al. | 296/107 |
| 3,276,814 | 10/1966 | Podolan | 296/107 |
| 3,486,788 | 12/1969 | Benton | 296/120.1 |

FOREIGN PATENT DOCUMENTS

| 0304554 | 3/1989 | European Pat. Off. | 296/121 |
| 835845 | 7/1949 | Fed. Rep. of Germany | 296/219 |
| 1192529 | 5/1965 | Fed. Rep. of Germany | 296/107 |
| 1000773 | 2/1952 | France | 296/107 |
| 1489850 | 7/1967 | France | 296/219 |
| 501252 | 11/1954 | Italy | 296/107 |
| 0873939 | 8/1961 | United Kingdom | 296/107 |

Primary Examiner—Dennis H. Pedder
Attorney, Agent, or Firm—Evenson, Wands, Edwards, Lenahan & McKeown

[57] ABSTRACT

A top cover for a collapsible top of a motor vehicle is supported, in the region of a windscreen frame of the motor vehicle, by a rigid roof panel located under it. A cloth lug is fastened to the flexible top cover near the rear end of the roof panel and extends in a transverse direction of the vehicle. The lug can be secured to the underside of the roof panel and consequently keeps the flexible top cover resting against the roof panel.

10 Claims, 1 Drawing Sheet

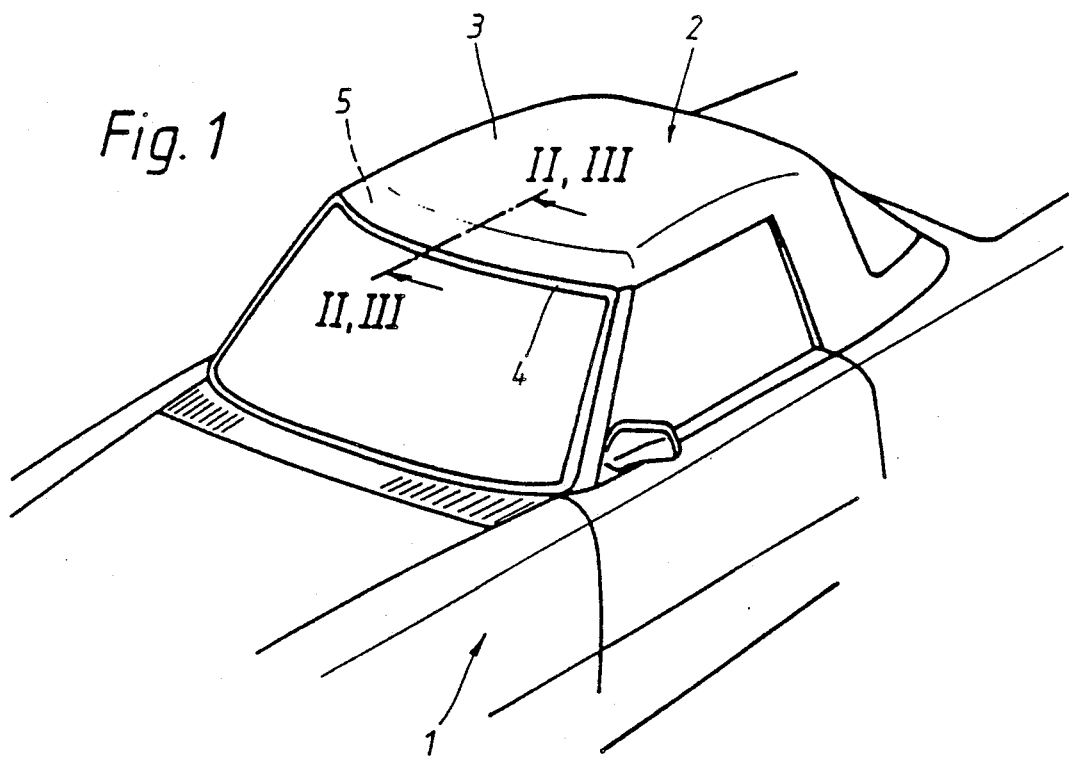
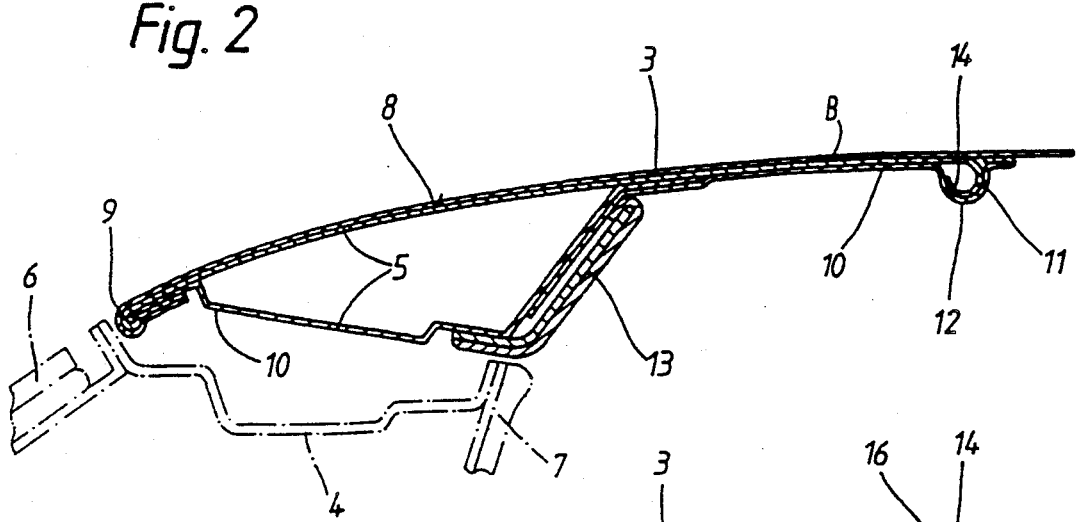
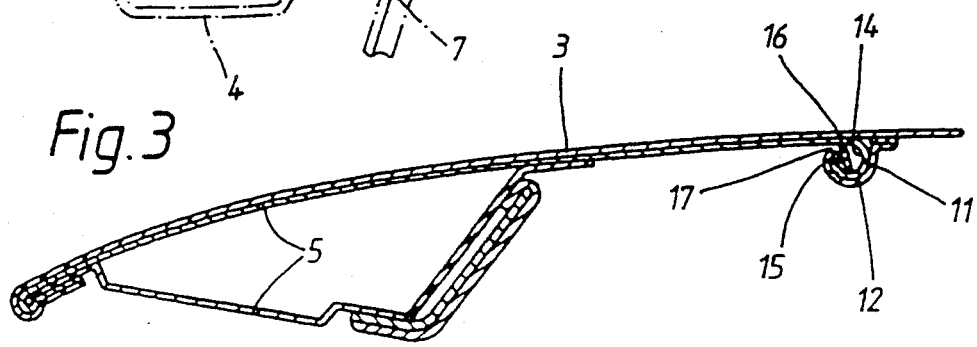

COLLAPSIBLE TOP FOR MOTOR VEHICLES

BACKGROUND AND SUMMARY OF THE INVENTION

The present invention generally relates to a collapsible top for motor vehicles and more particularly to an arrangement for connecting a top cover to a rigid roof panel in a secure manner.

Known sports cars with a collapsible top possess, in the region of a windscreen frame, a rigid roof panel located under the top cover to which the top cover is fastened and which, extending in the transverse direction of the vehicle, supports the top cover.

For this purpose, the top cover is conventionally guided over the outer face of the roof panel and round its front contour edge and is secured to the underside of the roof panel.

With this type of fastening, a defect arises at high vehicle speeds because, as a result of the strong upwind occurring in the region of the windscreen, the top cover lifts off from the roof panel at the rear end of the latter, thereby forming between the roof panel and cloth sheet a gap which continually changes as a result of the wind turbulences and which has an ugly appearance, but above all causes troublesome fluttering noises in the top.

Thus, an object of the present invention is, to provide an arrangement which secures a top cover of a collapsible top to a rigid roof panel in such a way that it does not lift off from the roof panel under a strong upwind.

These and other objects of the present invention are achieved by means of a unique arrangement whereby the top cover is secured to the rigid roof panel by a cloth lug fastened to the covering near a rear of the rigid roof panel.

According to certain advantageous features of preferred embodiments of the present invention, the top cover, because of the cloth lug fastened to it, acquires additional retention on the underside of the roof panel and can thereby transmit the strong upwind forces occurring at high vehicle speeds to the roof panel. A gap is prevented from forming between the rear end of the roof panel and the top cover.

The contact of the top cover against the roof panel can be maintained especially effectively if the cloth lug is fastened to the top cover along the rear contour of the roof panel, so that no covering material is available for a lifting-off movement of the top cover.

According to one embodiment of the present invention, the cloth lug is secured firmly to the underside of the roof panel by an adhesive bond, and it is also visually attractive if, at the same time, the cloth lug has such a large surface that it reaches up to a trim piece fastened to the roof panel.

Because of the tensile stresses transmitted to the top cover and the cloth lug, it is advantageous to bend the rear end of the roof panel in a rounded manner, so that no sharp tearing edges occur.

According to another embodiment of the present invention, bending the underside of the roof panel in a rounded manner can also serve for securing the cloth lug, if it has a cross-section approximately in the form of a three-quarter circle, into the orifice of which a rail fastened to the free cloth-lug end can be pressed, the rail being rotated in this orifice as a result of the subsequent counterpulling of the cloth lug to thereby clamping the cloth-lug end.

Other objects, advantages and novel features of the present invention will become apparent from the following detailed description of the invention when considered in conjunction with the accompanying drawings.

BRIEF DESCRIPTION OF THE DRAWINGS

FIG. 1 shows a sports car body with a collapsible top, and

FIGS. 2 and 3 each show an embodiment of a top cover secured to a roof panel in respective sections along the lines II—II, III—III of FIG. 1.

DETAILED DESCRIPTION OF THE DRAWINGS

Two exemplary embodiments in accordance with the teachings of the present invention are illustrated in the drawing as will be described hereinafter.

FIG. 1 illustrates a sports car body 1 with a collapsible top 2 comprising a top cover 3 which is supported, in the region of a windscreen frame 4, by a rigid roof panel 5 located under the top cover and extending in the transverse direction of the vehicle.

As is evident from FIG. 2, a windscreen 6 is fixed to the windscreen frame 4 and an inner trim piece 7 is secured towards the vehicle interior. The rigid roof panel 5 is likewise connected releasably to the windscreen frame 4 by a roof-holding device not shown here.

The top cover 3 is guided over the outer face 8 of the roof panel 5 and around its front rounded contour edge 9 and is adhesively bonded to the underside 10 of the roof panel 5 designed partially as a hollow section.

So that the top cover 3 cannot lift off from the roof panel 5 under vertical upwind forces which occur, thereby resulting in an unfavorable gap between the top cover 3 and the rear end 11 of the roof panel 5, a cloth lug 12 is connected to the top cover 3 such as, by stitching, along the rear contour of the roof panel 5 and is likewise adhesively bonded (the bond interface B in FIG. 2) to the underside 10 of the roof panel 5. In the region of the rear end 11 of the roof panel 5, the top cover 3 thereby acquires additional retention against the underside 10 of the roof panel 5. For the sake of visual appearance, the cloth lug 12 overlaps the underside 10 of the roof panel 5 as far as a point located under a trim piece 13 secured to the roof panel 5.

To prevent the point of connection of the top cover 3 to the cloth lug 12 from being subjected to additional stress by a sharp edge on the rear contour of the roof panel 5, the rear end 11 of the roof panel 5 has, relative to the underside 10 of the roof panel 5, a bend 14 of a cross-section approximately in the form of a three-quarter circle.

In the embodiment according to FIG. 3, such a bend 14 is utilized to secure the free cloth-lug end 15 to the roof panel 5. For this purpose, a rail 16 is fastened to the free cloth-lug end 15 along the latter, in such a way that it can be pressed into the remaining orifice 17 of the bend 14 as a result of a pull exerted on the cloth lug 12, and then it rotates in the orifice 17 as a result of the subsequent counterpulling of the cloth lug 12 and clamps the cloth-lug end 15 in the bend 14.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A collapsible top for a motor vehicle, with a top cover which, in a region of a windscreen frame of the motor vehicle, is supported by and fastened to a rigid roof panel located under the top cover and extending in the transverse direction of the vehicle, wherein the top cover is secured to an underside of the roof panel by a cloth lug fastened to the top cover near a rear end of the roof panel and being fixed at the underside of the roof panel and being spaced from a front end termination of the top cover in the region of the windscreen frame.

2. A collapsible top according to claim 1, wherein the cloth lug is fastened to the top cover along a rear contour of the roof panel.

3. A collapsible top according to claim 1, wherein the cloth lug is adhesively bonded to the underside of the roof panel.

4. A collapsible top according to claim 3, wherein the cloth lug overlaps the underside of the roof panel up to an inner trim piece.

5. A collapsible top according to claim 1, wherein the rear end of the roof panel has, relative to the underside, a bend having an open slot generally directed toward the windscreen frame.

6. A collapsible top according to claim 5, wherein a rail is fastened to and along a free cloth-lug end by which the cloth-lug end can be clamped in the bend.

7. A collapsible top according to claim 3, wherein the cloth lug is fastened to the top cover along a rear contour of the roof panel.

8. A collapsible top according to claim 4, wherein the cloth lug is fastened to the top cover along a rear contour of the roof panel.

9. A collapsible top according to claim 6, wherein the bend has a cross-section approximately in the form of a three quarter circle.

10. A collapsible top according to claim 2, wherein the rear contour of the roof panel is curved.

* * * * *